United States Defensive Publication [19] (H) [11] T105,404

Hsieh et al. [43] May 7, 1985

[54] BENEFICIATION OF PHOSPHATE ORES CONTAINING SURFACE ACTIVATED SILICA

[76] Inventors: Shuang-shii Hsieh, 1622 Bridlewood Dr.; James R. Lehr, 124 Riverview Dr., both of Florence, Ala. 35630

[21] Appl. No.: 650,390

[22] Filed: Sep. 14, 1984

[51] Int. Cl.[3] ..... B03D 1/14

[52] U.S. Cl. ..... 209/166

[57] ABSTRACT

A phosphate ore flotation process comprising subjecting a phosphate ore containing surface-activated silica and silicates to froth flotation in the presence of a fatty-acid collector, recovering the phosphate concentrate from the overflow; removing the fatty acid collector from the phosphate concentrate in the presence of a sulfuric acid deoiling agent; subjecting the phosphate concentrate to a reverse froth flotation in the presence of a silica collector and a modifier, said silica collector being an amine and said modifier being either alkyl diphosphonic acid, or being HF; removing the separated silica from the overflow; and recovering the phosphate product in the underflow. The process of the present invention not only overcomes the problems of activated silica flotation, but also results in greatly improved grade and/or recovery of phosphate product in comparison to present conventional phosphate ore flotation processing.

2 Claims, No Sheets Drawing,

13 Pages Specification

The file of this unexamined application may be inspected and copies thereof may be purchased (849 O.G. 1221, Apr. 9, 1968).